(12) United States Patent
Ruppelt

(10) Patent No.: US 6,571,236 B1
(45) Date of Patent: May 27, 2003

(54) METHOD AND APPARATUS FOR PROBLEM DIAGNOSIS AND SOLUTION

(75) Inventor: Kevin Michael Ruppelt, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/480,585

(22) Filed: Jan. 10, 2000

(51) Int. Cl.⁷ .............................................. G06F 17/30
(52) U.S. Cl. ............................................. 707/3; 707/10
(58) Field of Search ........................... 707/10, 3; 705/1, 705/8; 709/207

(56) References Cited

U.S. PATENT DOCUMENTS

| | | | |
|---|---|---|---|
| 4,992,940 A | | 2/1991 | Dworkin ...................... 705/26 |
| 5,737,414 A | | 4/1998 | Walker et al. ................. 705/40 |
| 5,794,207 A | | 8/1998 | Walker et al. ................. 705/1 |
| 5,797,127 A | | 8/1998 | Walker et al. ................. 705/5 |
| 5,798,508 A | | 8/1998 | Walker et al. ............... 235/380 |
| 5,822,743 A | * | 10/1998 | Gupta et al. .................. 706/50 |
| 5,842,178 A | | 11/1998 | Giovannoli ................... 705/26 |
| 5,884,274 A | | 3/1999 | Walker et al. ................. 705/4 |
| 5,944,839 A | * | 8/1999 | Isenberg ....................... 714/26 |
| 6,029,258 A | * | 2/2000 | Ahmad ......................... 714/46 |
| 6,098,061 A | * | 8/2000 | Gotoh et al. .................. 706/50 |
| 6,131,085 A | * | 10/2000 | Rossides ........................ 705/1 |
| 6,223,165 B1 | * | 4/2001 | Lauffer .......................... 705/1 |
| 6,263,362 B1 | * | 7/2001 | Donoho et al. ............. 709/206 |
| 6,321,192 B1 | * | 11/2001 | Houchin et al. ............... 704/9 |
| 6,463,437 B1 | * | 10/2002 | Mongilio ..................... 707/10 |

OTHER PUBLICATIONS

Wallys W. Conhaim, Mar.–Apr., 1998, "Linking up to a global network (emerging online guide service on the internet", 11Pages.*

Cynthia Hodgson, Dec., 1999, "online EXPERT Database & Services", 7 Pages.*

* cited by examiner

Primary Examiner—Safet Metjahic
Assistant Examiner—Haythim Alaubaidi
(74) Attorney, Agent, or Firm—George L. Rideout, Jr., Esq.; Armstrong Teasdale LLP

(57) ABSTRACT

A method for problem diagnosis based on queries received from remote locations includes the steps of determining applicable solution recommendations based on a diagnosis query, displaying the applicable solution recommendations on a screen of a remote terminal, and determining whether a case based reasoning tool is available to answer the diagnosis query. When the case based reasoning tool is available, the method presents the case based reasoning tool on the screen with the applicable solution recommendations.

20 Claims, 3 Drawing Sheets

METHOD AND APPARATUS FOR PROBLEM DIAGNOSIS AND SOLUTION

BACKGROUND OF THE INVENTION

The present invention generally relates to problem diagnosis and solution systems, and in particular relates to a network based problem diagnosis and solution system combining both keyword search of a solution recommendation database and case based reasoning to determine applicable solutions to present to a remote user.

With the steady progress of technology have come increasingly sophisticated appliances, consumer electronics products, and the like. The sophistication of these devices, however, also gives rise to the potential for many more problems associated with their operation. While many of the problems (e.g., a faulty microprocessor) are generally not fixable by the consumer, many problems may, in fact, be satisfactorily addressed by the consumer. Thus, a dishwasher with excessive spotting or a clothes washer in which the fabric softener dispenser is not working may, in fact, have solutions that the consumer can implement at home.

With the explosive growth of the Internet has come the availability of vast amounts of information to every home with even a marginally sophisticated personal computer. In the past, however, Internet web sites offered little troubleshooting information for consumer products. For example, some previous web sites simply offered portions of product manuals in text form online, or simple keyword searching through a troubleshooting document database.

However, while the answer to a problem may lie buried somewhere in a document database, it was the responsibility of the consumer to pick the keywords that would turn up the solution. Consumers, of course, are not trained in the art of database searching. Thus, in many instances, the keyword search returned no applicable solutions, or, more frequently, far too many applicable (and non-applicable) solutions. As a result, even if the appropriate solution is in the document database, and the appropriate solution is returned from the keyword search, the appropriate solution may still be buried in a deluge of non-applicable solution documents presented to the user.

Thus, a need has long existed for a problem diagnosis and solution system that receives queries from remote users that overcomes the problems noted above and others previously experienced.

BRIEF SUMMARY OF THE INVENTION

A preferred embodiment of the present invention provides a method for problem diagnosis based on queries received from remote locations. The method includes the steps of determining applicable solution recommendations based on a diagnosis query, displaying the applicable solution recommendations on a screen of a remote terminal, and determining whether a case based reasoning tool is available to answer the diagnosis query. When the case based reasoning tool is available, the method presents the case based reasoning tool on the screen with the applicable solution recommendations.

A preferred embodiment of the present invention also provides a network based problem diagnosis tool for diagnosing problems at remote locations. The diagnosis tool includes a network interface for receiving a diagnosis query from a remote terminal, a processing circuit coupled to the network interface, and a memory coupled to the processing circuit. The memory stores instructions for identifying keywords in the diagnosis query, matching the keywords against a solution recommendation database to determine applicable solution recommendations, and displaying the applicable solution recommendations on a screen of the remote terminal. The memory further includes instructions for determining whether a case based reasoning tool is available to answer the diagnosis query, and when the case based reasoning tool is available, presenting the case based reasoning tool on the screen.

DETAILED DESCRIPTION OF THE INVENTION

Figure 1:
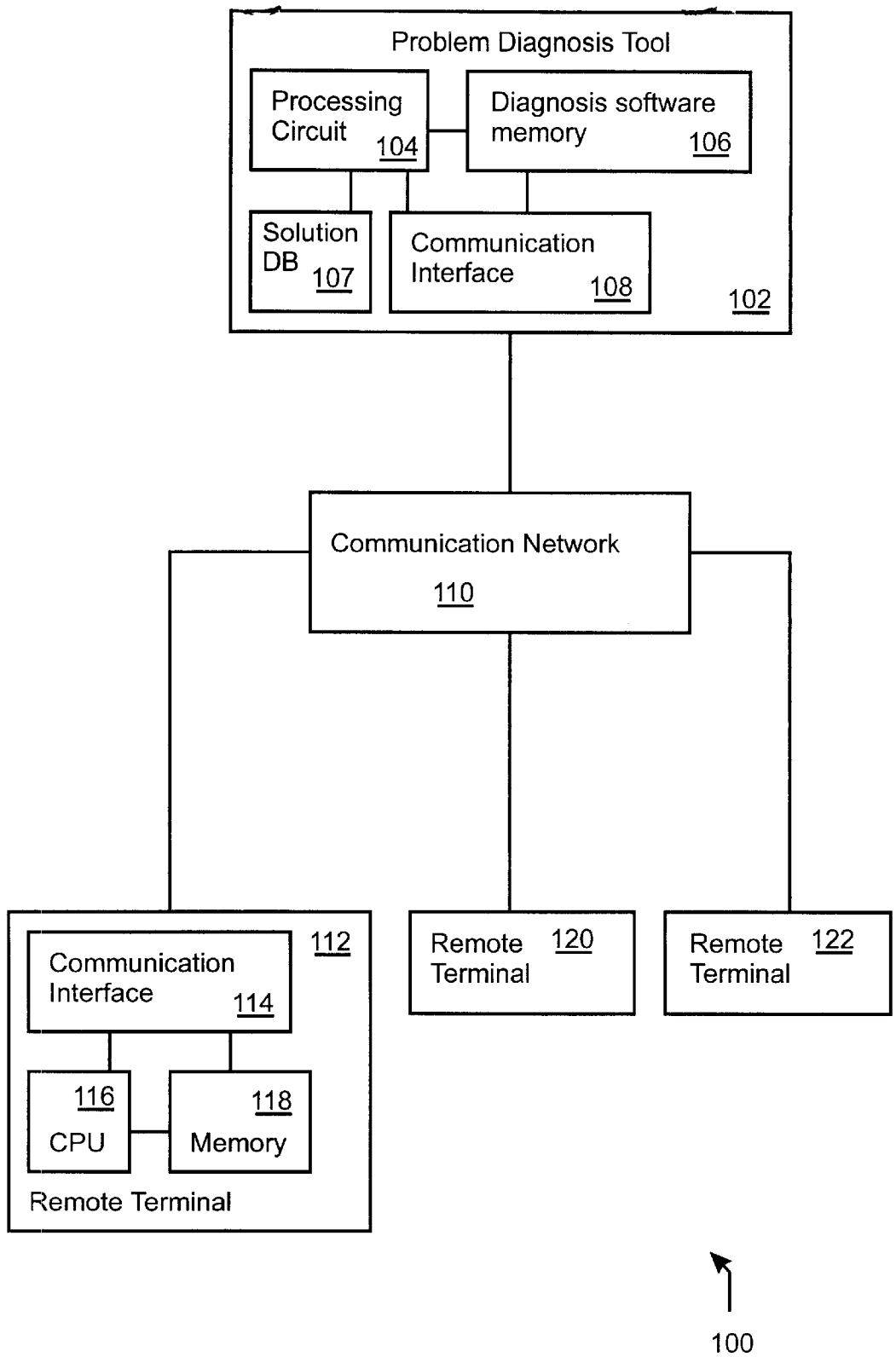
FIG. 1 illustrates a problem diagnosis and solution tool connected through a communication network to remote terminals.

Turning to FIG. 1, that figure illustrates a network configuration 100, including a problem diagnosis tool 102. The problem diagnosis tool 102 includes a processing circuit 104 interconnected with a diagnosis software memory 106, a solution recommendation database 107, and a communication interface 108. The diagnosis software memory 106 is one example of a computer readable storage medium that stores instructions for execution by the processing circuit 104. The computer readable storage medium may be implemented, as examples, using a floppy disk, hard disk, magnetic tape, Read Only Memory (ROM), or Random Access Memory (RAM).

FIG. 1 also illustrates a communication network 110 that connects the problem diagnosis tool 102 to a remote terminal 112. The remote terminal 112 includes a communication interface 114 interconnected with a processing circuit 116 and a general purpose memory 118. Additional remote terminals 120 and 122 are also connected through the communication network 110 to the problem diagnosis tool 102.

The communication network 110 may represent, for example, Internet routing and switching functions, or may represent proprietary LAN or WAN networks. The communication interfaces 108 and 114 may be implemented, as examples, as network interface cards or modems, and may be hardwired or wireless. The processing circuits 104 and 116 may be general purpose CPUs, such as those in the Pentium™ line of processors. As will be explained in greater detail below, the diagnosis software memory 106 stores instructions for execution by the processing circuit 104 that allow the processing circuit 104 to diagnose and present solutions to diagnosis queries submitted by the remote terminals 112, 120, 122.

In the preferred embodiment, the remote terminals 112, 120, 122 represent personal computers connected over the Internet to the problem diagnosis tool 102. To that end, the remote terminals 112, 120, 122 execute Internet browsing software, for example, Netscape Navigator™ or Microsoft Internet Explorer™. The problem diagnosis tool 102 executes complimentary Internet web server and hosting software, thereby receiving diagnosis queries from the remote terminals 112, 120, 122, and responsively presenting solution recommendations (e.g., as JAVA enhanced HTML documents) as explained in more detail below.

Figure 2:
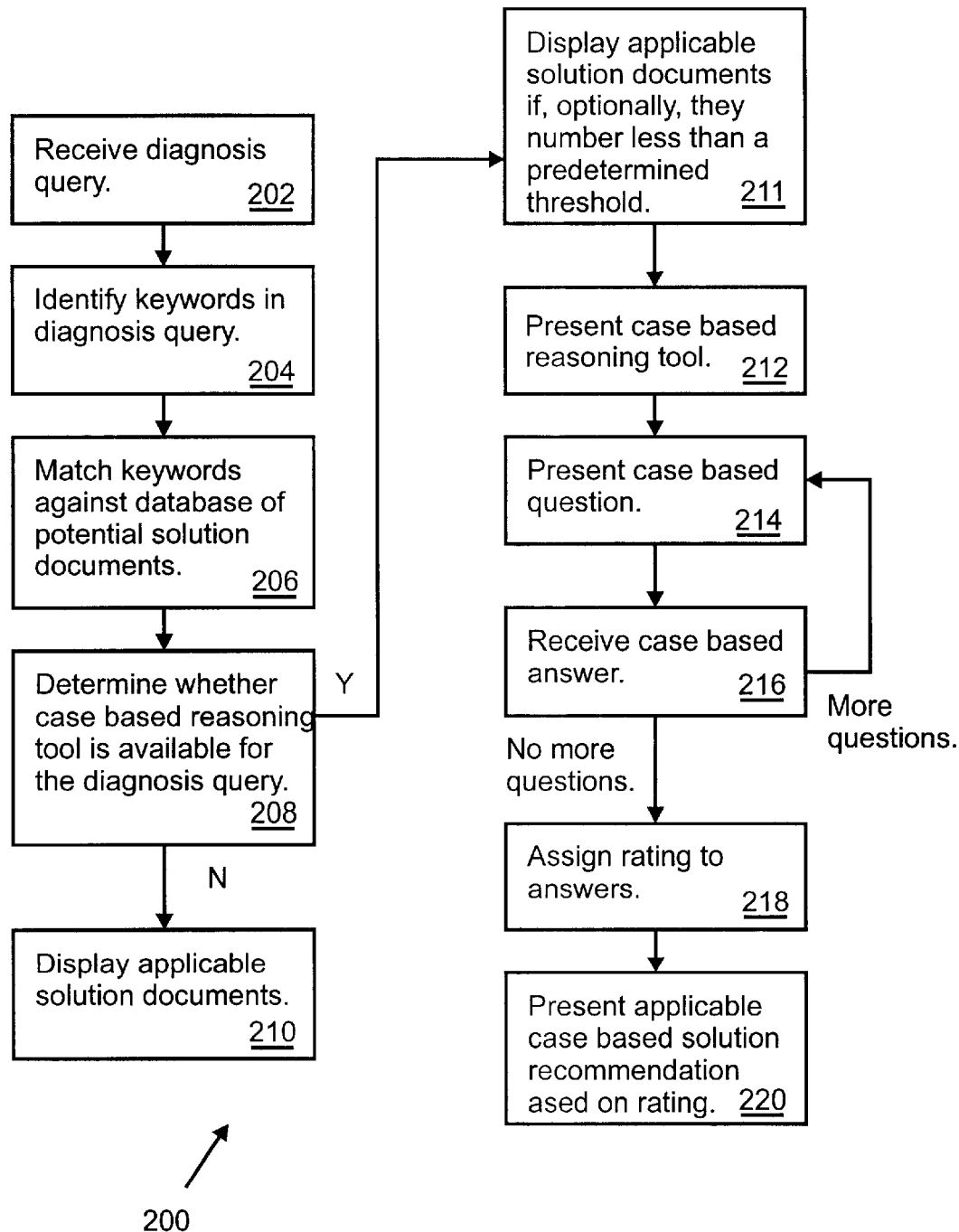
FIG. 2 shows a flow diagram for providing problem diagnosis and solution to a user.

Turning now to FIG. 2, that figure shows a flow diagram 200 of the steps executed by the processing circuit 104. At step 202, the processing circuit 104 receives over the communication network 110 and the network interface 108 a diagnosis query from a remote terminal 112, 120, 122. At step 204, the processing circuit 104 identifies predetermined keywords in the diagnosis query. Thus, for example, in response to a diagnosis query of "My dishwasher is leaking water all over my kitchen floor.", the processing circuit 104 extracts the keywords "dishwasher", "leaking", and "water". Generally, keywords are the words in a query most indicative of the problem to be solved. What constitutes a keyword may be determined heuristically and by previous troubleshooting case studies, such as might be gained from the gamut of previous cases solved by a telephonic help desk service.

Next, at step 206, the processing circuit 104 matches the keywords against the solution recommendation database 107 to determine applicable solution recommendations. In other words, the applicable solution recommendations include at least one, but preferably all of the keywords. Before displaying the applicable solution recommendations, however, the processing circuit 104 determines whether a case based reasoning tool exists to answer the diagnosis query (step 208). As an example, the processing circuit 104 may attempt to match the keywords to any number of case based reasoning approaches stored in the solution database 107 (having their own keyword flags) to determine all appropriate case based reasoning tool for the diagnosis query. If an appropriate case based reasoning tool does not exist, the processing circuit 104 presents the applicable solution recommendations to the remote terminal 112, for example, in a hyper linked list of applicable solution documents (step 210).

On the other hand, when a case based reasoning tool exists for the diagnosis query, the processing circuit 104 invokes the case based reasoning tool. First, however, the processing circuit 104 displays the applicable solution recommendations, if, optionally, the applicable solution documents are less in number than a predetermined threshold (step 211). In other words, rather than deluging the user of the remote terminal 112 with an excessive number of applicable solution documents, the processing circuit 104 may instead present only the case based reasoning tool. The processing circuit 104 may instead present only the case based reasoning tool under other circumstances as well, however. For example, when the processing circuit 104 determines that more than a keyword threshold number of keywords are present in a diagnosis query, the processing circuit 104 may invoke the case based reasoning tool to determine more precisely the nature of the problem and its solution. As an example, when the diagnosis query is "Unlike my refrigerator, freezer, and air-conditioner, my dishwasher is leaking water.", the keywords are "refrigerator", "freezer", "air-conditioner", "dishwasher", "leaking" and "water". An enormous amount of applicable solution documents may include one or more of the keywords. Thus, rather than matching the keywords to the solution recommendation database 107, the processing circuit 104 may instead immediately present a case based reasoning tool.

Continuing at step 212, the processing circuit 104 presents a case based reasoning tool based on the keywords in the diagnosis query. Thus, there may be case based reasoning tools tailored to handle dishwashers in general or leaky dishwashers in particular, refrigerators in general or refrigerators non-responsive to temperature controls in particular, as examples. There may also be a high level case based reasoning tool to handle a diagnosis query that includes keywords spanning multiple appliances, for example. In such a case based reasoning tool, the case based question may first ask "What appliance is experiencing the problem?". The case based answer may then more narrowly define the scope of the problem, e.g., "The dishwasher."

Thus, at step 214 and step 216, the case based reasoning tool presents case based questions and receives case based answers, respectively, in an interactive fashion with the user at the remote terminal 12. The question and answer process generally continues until no additional case based questions remain in the case based reasoning tool logic. The diagnostic tool 102 may then present the user of the remote terminal 112 with one or more applicable solution recommendations that, for example, describe solutions that worked in the past for similar problems. In one embodiment, however, the processing circuit first, at step 218, numerically rates the case based answers. In other words, the processing circuit 104 assigns a weight to each case based answer. Certain case based answers are thereby accorded more importance than other answers. For example, a case based answer that a dishwasher is leaking water may have less weight than the case based answer that the dishwasher leak is at the sink.

Thus, solution documents that describe leaks originating at the sink may be of more relevance than solution documents concerning leak dishwashers in general. Again, which case based answer are more telling of the problem at hand (and thus worthy of additional weight) may be determined heuristically or through past experience. With all of the case base answers in hand, the processing circuit 104 may then choose an applicable solution recommendation to display on the remote terminal 112 (step 220). The case based reasoning tools are not restricted to the implementation set forth above, however, but may be implemented according to any of many case based reasoning techniques available. Suitable case based reasoning tools may be obtained, for example, from Inference Corporation, Novato Calif., 94945.

Figure 3:
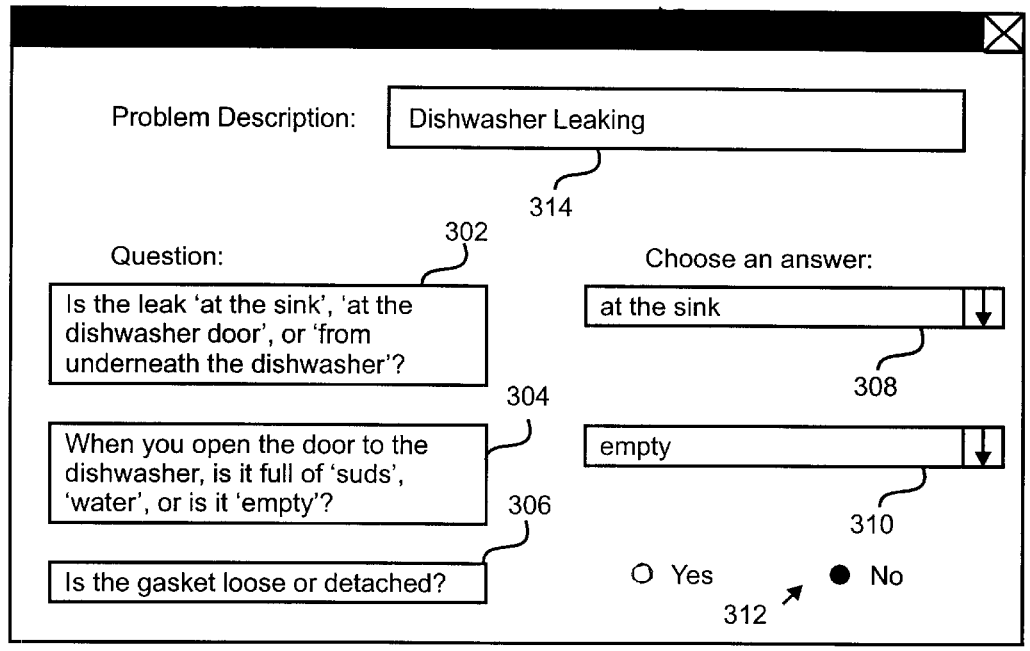
FIG. 3 illustrates one example of a case based reasoning tool for troubleshooting a leaky dishwasher.
Figure 3:
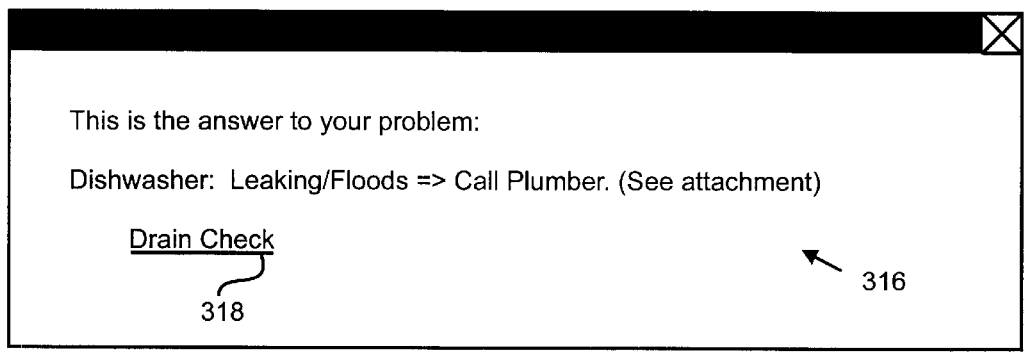

Turning now to FIG. 3, that figure illustrates one example of a case based reasoning tool 300 for troubleshooting a leaky dishwasher. FIG. 3 shows three case based questions 302, 304, and 306, and three associated case based answers 308, 310, 312. The processing circuit 104 selected the case based reasoning tool 300 based on the diagnosis query 314 which includes keywords pertaining to leaky dishwashers. Note that in some cases, the case based questions for a particular case based reasoning tool may be answered in any order. In other cases, however, the processing circuit 104 may present a predetermined question and answer sequence to the user. Once the case based questions are answered, the processing circuit 104 presents an applicable solution recommendation 316 to the user of the remote terminal 112. As shown in FIG. 3, the case based answers 308–312 are presented in drop down list boxes (for case based answers 308 and 310) and radio buttons (for case based answer 312). In this instance, the applicable solution recommendation 316 includes a recommendation to call a plumber, is well as a hyperlink to a case based solution recommendation 318 ("Drain Check") which provides more information about possible faulty plumbing that is causing the leak at the sink.

The solution recommendation database 107 may store a wide variety of applicable solution documents. For example, the solution recommendation database 107 may hold text solution documents describing the problem and its solution in written form, audio solution documents that audibly explain a problem and its solution, video solution documents visually illustrating a problem and demonstrating the solution, or a slide show (e.g., a sequence of still images) that illustrate the step-by-step process of solving a problem, or a mixture of text, audio, and video. To that end, and as examples, the text solution documents may be implemented as text files, the audio solution documents may be implemented as WAV or RealAudio™ files, the video solution documents may be implemented as MPEG, or AVI files, and the slide show solution documents may be implemented as individual JPG or GIF image files.

In certain situations, such as difficult to diagnose problems, or an applicable solution recommendation may be an interactive technician chat display. Such an interactive technician chat display includes a window in which the user at the remote terminal 112 types questions and answers, and which provides, typically on the same screen, a window in which a technician types questions, answers, and presents a solution to the user. Thus, the diagnostic tool 102 is not restricted to predetermined solutions in the solution recommendation database 107, but may instead give the user the benefit of a live question and answer session with an experienced technician.

Thus, the present invention provides a flexible and user friendly problem diagnosis tool. The diagnosis tool avoids deluging the user with inordinate amounts of information. Instead, the diagnosis tool switches to a case based reasoning approach when too many keywords are found in or too many applicable solution documents are found for a diagnosis query.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for consumer product problem diagnosis based on queries received from remote locations, the method comprising:

determining applicable solution recommendations based on diagnosis query for a problem associated with operation of the consumer product;

displaying the applicable solution recommendations for solving the consumer product problem on a screen of a remote terminal; and determining whether an interactive case based reasoning tool for the consumer product is available to answer the diagnosis query and when the case based reasoning tool is available, presenting the case based reasoning tool on the screen.

2. The method of claim 1, wherein the step of displaying comprises displaying the applicable solution recommendations only when the applicable solution recommendations are less in number than a solution threshold.

3. The method of claim 1, wherein determining comprises the steps of identifying consumer product problem keywords in the diagnosis query and matching the keywords against a consumer product problem solution recommendation database.

4. The method of claim 3, wherein the step of displaying comprises displaying the applicable solution recommendations when the keywords are less in number than a keyword threshold.

5. The method of claim 1, wherein the consumer product is an appliance, and wherein the step of presenting includes displaying a case based question to a user and receiving a case based answer from the user, the cased based question and answer more narrowly defining the scope of the appliance problem in an interactive fashion.

6. The method of claim 5, further comprising the steps of assigning a rating based the case based answer and selecting a case based solution recommendation based on the rating.

7. The method of claim 1, wherein displaying further comprises displaying the applicable solution recommendations including at least one of a text solution document, audio solution document, video solution document, and slide show solution document to the remote terminal.

8. The method of claim 1, wherein displaying further comprises displaying the applicable solution recommendations including an interactive technician chat display.

9. The method of claim 1, wherein the step of presenting includes displaying a plurality of case based questions and receiving a like plurality of case based answers.

10. A consumer product problem solving computer program product comprising:

a storage medium readable by a processing circuit and storing for execution by the processing circuit:

instructions for determining applicable solution recommendations based on a user input consumer product problem diagnosis query;

instructions for displaying the applicable solution recommendations for solving the consumer product problem on a screen of a remote terminal; and instructions for determining whether an interactive consumer product problem solving case based reasoning tool is available to answer the diagnosis query by more narrowly defining the scope of the problem, and when the case based reasoning tool is available, presenting the case based reasoning tool on the screen.

11. The computer program product of claim 10, wherein the instructions for displaying comprise instructions for displaying the applicable solution recommendations only when the applicable solution recommendations are less in number than a solution threshold.

12. The computer program product of claim 10, wherein the instructions for determining include instructions for identifying keywords in the diagnosis query and matching the keywords against a solution recommendation database.

13. The computer program product of claim 12, wherein the instructions for displaying comprise instructions for displaying the applicable solution recommendations when the keywords are less in number than a keyword threshold.

14. The computer program product of claim 10, wherein the consumer product is an appliance, and wherein the instructions for displaying further comprise instructions for displaying the applicable appliance problem solution recommendations including at least one of a text solution document, audio solution document, video solution document, and interactive technician chat display, and slide show solution document to the remote terminal.

15. A network based problem diagnosis tool for diagnosing problems associated with a consumer product at a remote location, the diagnosis tool comprising:

a communication interface for receiving a diagnosis query from a remote terminal, the diagnosis query concerning a problem associated with operation of the consumer product;

a processing circuit coupled to the communication interface; and a memory coupled to the processing circuit, the memory storing instructions for: identifying keywords in the diagnosis query;

matching the keywords against a consumer product solution recommendation database to determine applicable solution recommendations;

displaying the applicable solution recommendations on a screen of the remote terminal; and determining whether a case based reasoning tool is available to answer the diagnosis query for the consumer product problem received in the diagnosis query, and when the case based reasoning tool is available, presenting the case based reasoning tool on the screen.

16. The diagnosis tool of claim 15, wherein the instructions for displaying comprise instructions for displaying the applicable solution recommendations when the applicable solution recommendations are less in number than a solution threshold.

17. The diagnosis tool of claim 15, wherein the consumer product problem relates to a problem with an appliance, and wherein instructions for presenting a case based reasoning tool further comprise instructions that interactively present a plurality of case based questions, receive a plurality of case based answers, generate a rating based the case based answers, and select a case based solution recommendation based on the rating to solve the appliance problem.

18. The diagnosis tool of claim 15, wherein the solution recommendation database comprises a plurality of text solution documents.

19. The diagnosis tool of claim 15, wherein the solution recommendation database comprises solution recommendations selected from the group consisting of audio solution documents, video solution documents, and slide show solution documents.

20. The diagnosis tool of claim 15, wherein the applicable solution recommendations include an interactive technician chat display.

* * * * *